United States Patent
Berns, Jr. et al.

(10) Patent No.: US 10,934,177 B2
(45) Date of Patent: Mar. 2, 2021

(54) PROCESS FOR PURIFICATION OF CONTAMINATED WATER

(71) Applicant: GUILD ASSOCIATES INC., Dublin, OH (US)

(72) Inventors: Henry C. Berns, Jr., Florissan, CO (US); David L. Church, Zanesville, OH (US); Michael J. Knapke, Plain City, OH (US); Daniel Moeller, Columbus, OH (US); Joseph A. Rossin, Columbus, OH (US)

(73) Assignee: GUILD ASSOCIATES, INC., Dublin, OH (US)

( * ) Notice: Subject to any disclaimer, the term of this patent is extended or adjusted under 35 U.S.C. 154(b) by 0 days.

(21) Appl. No.: 16/677,234

(22) Filed: Nov. 7, 2019

(65) Prior Publication Data
US 2020/0071193 A1    Mar. 5, 2020

Related U.S. Application Data

(62) Division of application No. 15/366,379, filed on Dec. 1, 2016, now Pat. No. 10,472,259.

(51) Int. Cl.
*C02F 1/16* (2006.01)
*B01L 3/02* (2006.01)
(Continued)

(52) U.S. Cl.
CPC .............. *C02F 1/16* (2013.01); *B01D 3/007* (2013.01); *B01D 3/143* (2013.01); *B01L 3/02* (2013.01); *C02F 1/048* (2013.01); *C02F 1/725* (2013.01); *C02F 2303/10* (2013.01); *E21B 43/26* (2013.01); *E21B 43/34* (2013.01); *Y02W 10/30* (2015.05)

(58) Field of Classification Search
CPC . C02F 1/048; C02F 1/16; C02F 1/725; B01D 3/007; B01D 3/02; B01D 3/143
See application file for complete search history.

(56) References Cited

U.S. PATENT DOCUMENTS

| 3,804,756 A | 4/1974 | Grasselli et al. ............. 210/763 |
| 5,160,636 A | 11/1992 | Gilles et al. .................. 210/763 |

(Continued)

OTHER PUBLICATIONS

Cha, Zhixiong et al., "Removal of Oil and Oil Sheen from Produced Water by Pressure-Assisted Ozonation and Sand Filtration," Chemosphere, vol. 78, pp. 583-590, Oct. 20, 2009.

(Continued)

*Primary Examiner* — Jonathan Miller
(74) *Attorney, Agent, or Firm* — Slayden Grubert Beard PLLC

(57) ABSTRACT

Various embodiments may include a system for removing contaminants from contaminated water comprising: a distillation still supplying heat to contaminated water to boil the contaminated water; a vent allowing a vapor stream to exit the distillation still; an oxidation unit removing additional contaminants from the vapor stream; an outlet discharging a purified water stream from the oxidation unit; and a heat exchanger transferring heat from the purified water stream leaving the oxidation unit to the vapor stream exiting the distillation still before the vapor stream enters the oxidation unit.

7 Claims, 1 Drawing Sheet

(51) Int. Cl.
*B01D 3/14* (2006.01)
*B01D 3/00* (2006.01)
*C02F 1/72* (2006.01)
*C02F 1/04* (2006.01)
*E21B 43/26* (2006.01)
*E21B 43/34* (2006.01)

(56) References Cited

U.S. PATENT DOCUMENTS

| | | | | |
|---|---|---|---|---|
| 5,205,906 | A | * | 4/1993 | Grutsch ................. B01D 53/86 159/47.3 |
| 5,562,834 | A | * | 10/1996 | Bremer ................... A62D 3/37 210/750 |
| 5,651,833 | A | | 7/1997 | Bremer et al. ............. 134/22.15 |
| 5,891,345 | A | | 4/1999 | Bremer et al. ................ 210/750 |
| 7,438,129 | B2 | | 10/2008 | Heins ........................... 166/266 |
| 7,967,955 | B2 | | 6/2011 | Heins .............................. 203/12 |
| 8,834,726 | B2 | | 9/2014 | Keister ......................... 210/726 |
| 9,738,545 | B2 | | 8/2017 | Duesel, Jr. et al. | |
| 10,472,259 | B2 | * | 11/2019 | Berns ....................... B01D 3/02 |
| 2014/0116948 | A1 | | 5/2014 | Meyer ........................... 210/667 |
| 2015/0122498 | A1 | | 5/2015 | Duesel, Jr. et al. ....... 166/305.1 |
| 2017/0369331 | A1 | * | 12/2017 | Elgat .......................... C02F 1/16 |
| 2018/0155213 | A1 | | 6/2018 | Berns et al. | |

OTHER PUBLICATIONS

Shokrollahzadeh, S. et al., "Chemical Oxidation for Removal of Hydrocarbons from Gas-Field Produced Water," 20th International Congress of Chemical and Process Engineering CHISA, Prague, Czech Republic, pp. 942-947, Aug. 25, 2012.

Thiel, Gregory P. et al., "Energy Consumption in Desalinating Produced Water from Shale Oil and Gas Extraction," Desalination, vol. 366, pp. 94-112, Jan. 15, 2015.

* cited by examiner

PROCESS FOR PURIFICATION OF CONTAMINATED WATER

CROSS-REFERENCE TO RELATED APPLICATIONS

This application is a Divisional of U.S. application Ser. No. 15/366,379 filed on Dec. 1, 2016, which is incorporated herein in its entirety.

TECHNICAL FIELD

The present disclosure relates to water purification. The teachings thereof may be embodied in processes and/or systems for purifying contaminated water. For example, they may be employed to purify flowback water and/or produced water generated in hydraulic fracturing (fracking) operations.

BACKGROUND

Hydraulic fracturing (also referred to as fracking and/or hydrofracking) injects pressurized water, usually containing sand and chemicals (e.g., surfactants), into wellbores with the intent of stimulating hydrocarbon production. This mixture is referred to as fracking fluid. Fracking fluid is injected primarily into shale formations to break apart the shale. The sand enters the resulting cracks, to keep open pathways for natural gas or oil to flow to the surface. Although the fracking process is used to generate an abundant flow of petroleum products, including methane, the process forces significant amounts of contaminated water to the surface as wastewater.

Wastewater generated in these operations includes both flowback water and produced water. Flowback water is defined as a mixture of fracking fluid plus formation water (water present in the shale rock formation) and is the first water generated by the well. The chemical composition of flowback water resembles that of the fracking fluid. Produced water follows flowback water and resembles more closely the composition of water present in the shale formation. Produced water is generated throughout the life of the well, in some cases discharging up to 2,500 barrels per day.

Both flowback and produced water are contaminated with a range of inorganic and organic chemicals and must be treated before releasing them to the environment. The composition of flowback and produced water varies from well to well, and also varies over the life of the well. Contaminants in both flowback and produced water may include suspended solids, dissolved material, and/or organic matter. Suspended solids may include sand, dirt, and/or insoluble metal complexes. Dissolved material may include inorganic cations and anions such as cations of barium, calcium, iron, magnesium, potassium, sodium and strontium, and anions of carbonate, chloride and sulfate. The concentration of dissolved material associated with produced water can be up to and in excess of to 250,000 mg/l. Organic matter may include dissolved compounds and/or dispersed oils. Dissolved compounds comprise organic compounds present in the water and may include organic acids (e.g., formic and propionic acids), aromatic hydrocarbons (e.g., benzene, ethylbenzene, toluene, and/or xylenes), polyaromatic hydrocarbons, and/or phenols. For the purpose of this document, ammonia and amines are referred to as dissolved organic compounds. Dispersed oils include droplets of oil suspended in flowback and/or produced water. If allowed to stand for a length of time, these droplets will rise to the surface of the water, forming a sheen. The total organic content of flowback and produced water can range up to and in excess of 1,500 mg/l.

A number of processes have been proposed for the treatment of flowback and produced water generated from oil, gas and oil-gas production fields. Said processes have included membrane filtration, distillation, evaporation ponds, adsorption and filtration, and chemical oxidation. The diverse composition of flowback water presents a burden on purification processes. This is because the process must be capable of removing suspended solids, dissolved material and organic matter to trace levels that will allow for re-use or release of the treated water. As a result, achieving target levels of purification while meeting cost and size constraints proves troublesome.

SUMMARY

The teachings of the present disclosure relate to purifying contaminated water. Various embodiments may include treatment of flowback water and/or produced water generated in hydraulic fracturing (fracking) operations.

In some embodiments, a process for removing contaminants from contaminated water may include: boiling a contaminated water to distill the contaminated water; removing a vapor stream from the boiling contaminated water; delivering the vapor stream to an oxidation unit; removing additional contaminants from the vapor stream in the oxidation unit; and discharging a purified water stream from the oxidation unit.

In some embodiments, the oxidation unit comprises a thermal oxidizer.

In some embodiments, the oxidation unit comprises a catalytic reactor.

Some embodiments may include adding air to the vapor stream before delivering the vapor stream to the oxidation unit.

In some embodiments, a heater adds heat to the vapor stream before delivering the vapor stream to the oxidation unit.

In some embodiments, the oxidation unit comprises a catalytic reactor operated at a temperature between 200° C. and 600° C. with a noble metal catalyst.

Some embodiments include recovering heat from the purified water stream after it exits the oxidation unit to supply at least part of the heat to the contaminated water.

In some embodiments, the contaminated water includes process water from a hydraulic fracturing operation.

Some embodiments may include a system for removing contaminants from contaminated water. The system may include: a distillation still boiling contaminated water to distill the contaminated water; a vent allowing a vapor stream to exit the distillation still; an oxidation unit removing additional contaminants from the vapor stream; and an outlet discharging a purified water stream from the oxidation unit.

In some embodiments, the oxidation unit comprises a thermal oxidizer.

In some embodiments, the oxidation unit comprises a catalytic reactor.

Some embodiments may include an inlet adding air to the vapor stream before entering the oxidation unit.

In some embodiments, the oxidation unit comprises a catalytic reactor operated at a temperature between 200° C. and 600° C. with a noble metal catalyst.

Some embodiments may include a heat exchanger recovering heat from the purified water stream after it exits the oxidation unit to supply at least part of the heat to the contaminated water.

Some embodiments may include a heat recovery loop including a heat exchanger with the purified water stream on the hot side and a steam compressor downstream of the heat exchanger supplying superheated steam to the distillation still for boiling the contaminated water.

In some embodiments, the contaminated water comprises process water from a hydraulic fracturing operation.

Some embodiments may include a process for hydraulic fracturing. The process may include: stimulating production of a hydrocarbon well by injecting a fracking fluid into a wellbore; recovering a stream of fluid from the wellbore; boiling the fluid to distill the fluid; removing a vapor stream from the boiling fluid; adding air to the vapor stream; delivering the vapor stream to an oxidation unit; removing contaminants from the vapor stream in the oxidation unit; and discharging a purified water stream from the oxidation unit.

In some embodiments, the oxidation unit comprises a thermal oxidizer.

In some embodiments, the oxidation unit comprises a catalytic reactor.

Some embodiments may include recovering heat from the purified water stream after it exits the oxidation unit to supply at least part of the heat to the contaminated water.

The figures are illustrative of example embodiments and do not limit the teachings of the present disclosure as encompassed by the claims forming part of the application.

DETAILED DESCRIPTION

Various embodiments of the teachings of the present disclosure may use a distillation still to remove suspended and dissolved solids from the contaminated water and an oxidation unit (e.g., a thermal oxidizer and/or catalytic reactor) to remove organic compounds from the water vapor exiting the distillation still. An oxidation source (e.g., air) may be added upstream of the oxidation unit. Such methods may produce a relatively organic-free process stream which, when it exits the oxidation unit, includes water of an extremely high purity.

Embodiments of the teachings herein may utilize distillation to remove suspended solids and dissolved material from the water, then employ a vapor phase oxidation process, such as thermal oxidation or catalytic oxidation, to remove the organic matter present in the water vapor.

Figure 1:
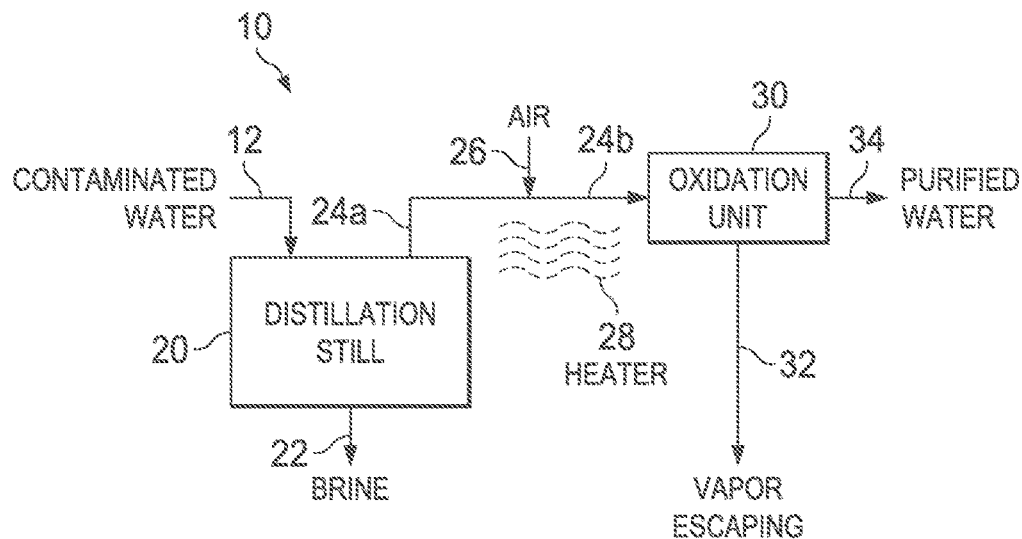
FIG. 1 is a schematic drawing illustrating an example system for implementing the teachings of the present disclosure.

FIG. 1 is a schematic drawing illustrating an example system 10 for implementing the teachings of the present disclosure. In some embodiments, the contaminated water 12 enters system 10 and is delivered to a distillation still 20. The contaminated water 12 may include a continuous flow, a periodic flow, and/or discrete batches of contaminated water. System 10 may be used to purify water contaminated with suspended solids, dissolved material, and/or organic matter, including biological organisms such as bacteria and viruses. Examples of contaminated water include, but are not limited to, flowback and produced water generated during hydrofracturing operations and/or other drilling operations. The contaminated water 12 is boiled in distillation still 20 to remove suspended solids and dissolved material, plus a portion of the organic matter (such as compounds having a boiling point significantly greater than that of water). By boiling the contaminated water 12, any bacteria and viruses are expected to be rendered inert.

Within the distillation still 20, the contaminated water 12 is heated to a temperature sufficient to bring about evaporation. Water vapor (steam) and any volatilized organic compounds 24a exit the top of the still 20. A mixture of suspended solids, dissolved material, and any non-volatilized organic matter (e.g., high molecular weight oils) 22 will remain in the distillation still and can be removed by techniques known to one skilled in the art, such as an auger screw, or merely washed from the distillation still.

The process stream 24a (water vapor and/or steam) may be heated with heater 28, may be combined with air and/or another oxidation source 26, and delivered to an oxidation unit 30 as process stream 24b. The oxidation unit 30 combines the process stream 24b with one or more oxidants (e.g., $O_2$). Any organic matter present in the process stream 24b is expected to be oxidized and thereby removed from the stream of water 34 exiting the oxidation unit 30. The oxidation unit 30 may include a thermal oxidizer and/or a catalytic reactor. The purified water vapor 34 exiting the oxidation unit may be condensed and recovered, or merely vented to atmosphere.

Figure 2:
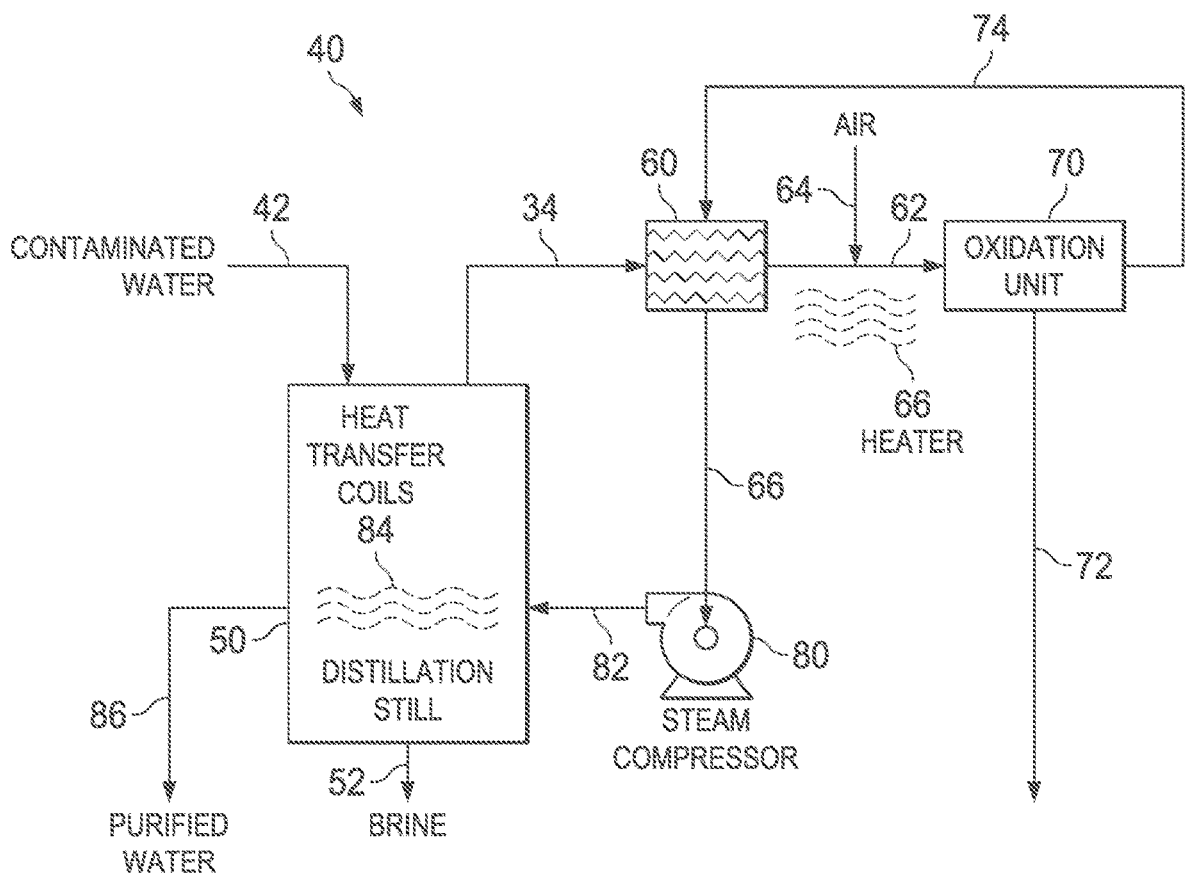
FIG. 2 is a schematic drawing illustrating an example system for implementing the teachings of the present disclosure.

FIG. 2 is a schematic drawing illustrating an example system 40 for implementing the teachings of the present disclosure. System 40 may include additional components in relation to system 10 that provide increased energy efficiency. In system 40, contaminated water 42 is delivered to a distillation still 50. Within the distillation still 50, the contaminated water 42 is heated at least to its boiling point, with water vapor/steam and/or volatilized organic compounds exiting the top of the still in process stream 54.

System 40 may include a heat exchanger 60. The process stream 54 may pass through a cold side of the heat exchanger 60 to gain thermal energy and/or raise the temperature of process stream 54. After exiting the heat exchanger 60 as heated process stream 62, system 40 may add air and/or another oxidation source, and/or a further heat source 66. The combination of heating may raise the process stream 62 to a target reaction temperature before entering an oxidation unit 70.

Oxidation unit 70 may include a thermal oxidizer and/or a catalytic reactor. The oxidation unit 70 converts any the organic matter associated with the process stream (via oxidation) to $CO_2$ and $H_2O$. The purified water vapor 74 exiting the oxidation unit may pass through the hot side of the heat exchanger 60 to recover heat from the purified vapor stream 74. Purified vapor stream 66 may be delivered at a temperature suitable for input to a steam compressor 80. The superheated, compressed process stream 82 exiting the steam compressor 80 may be delivered to heat exchanger coils 84 located within the distillation still 50.

In such an embodiment, the compressed, superheated process stream 82 has a condensation temperature greater than the boiling point of the incoming contaminated water and will thus provide the necessary temperature gradient to recover the heat of condensation from the water vapor 82. The effluent stream 86 exiting the heat exchanger coils 84 will be even further reduced in pressure and/or temperature. The purified water may be further cooled and recovered, or alternatively released to the atmosphere. Suspended solids, dissolved material, and/or any non-volatilized organic matter (high molecular weight oils) 52 will remain in the distillation still 50 and can be removed by techniques known to one skilled in the art, such as an auger screw, or merely washed from the distillation still.

Although FIGS. 1 and 2 show an oxidant (e.g., air), blended with the water vapor stream 24*a*, 54, an oxidant may be added at any location up-stream of the oxidation units 30, 70. For example, air can be added directly to the distillation still 20, 50. In either system, organic matter volatilized with the steam may be removed from the vapor phase process stream using an oxidation process (e.g., catalytic oxidation and/or thermal oxidation). At the end of the process, water may be vented to atmosphere or alternatively recovered for discharge or re-use. It is possible that the purified water may be high in $CO_2$ content due to the solubility of $CO_2$ in water. If the $CO_2$ content in the product water is excessive, the $CO_2$ content can be reduced to acceptable levels by aerating the water. The example processes described herein yield water that is of high purity, namely extremely low in dissolved solids and organic matter, and essentially free of suspended solids and bacteria/viruses.

Many processes proposed for the purification of contaminated water, such as produced and flowback water associated with hydrofacturing, are effective in their ability to remove suspended solids and dissolved material, but are not able to effectively remove organic matter, especially organic compounds that are soluble in water. Examples of organic compounds soluble in water include formic acid, benzene, toluene, and phenol. In contrast, the systems and methods described herein remove organic matter in the vapor phase by, for example, using oxidative technologies, such as catalytic oxidation and thermal oxidation, which may convert the organic matter to $CO_2$ and $H_2O$.

In practice, the systems and the methods of the present disclosure add the contaminated water to a distillation still which, upon heating, produces steam. Organic matter will often be present in the steam that exits the still. In order to remove the organic matter, air and/or another oxidant source is added to the process stream upstream of the oxidation unit. The process stream is heated to an elevated temperature sufficient to promote oxidation reactions involving the organic matter, such as greater than about 200° C. The heated process stream then enters an oxidation unit, such as a catalytic reactor or a thermal oxidizer. Systems including a catalytic reactor may have a smaller size and/or a lower temperature of operation. Within the oxidation unit, the vapor phase organic compounds are oxidized in the presence of an oxidant, such as $O_2$, to $CO_2$ and $H_2O$. The process stream exiting the oxidation unit contains purified water in the vapor phase. The purified water vapor may be released to the atmosphere or, alternatively, condensed for re-use or release into streams, lakes, rivers, irrigation systems, etc. Should the condensed water contain an unacceptable level of dissolved $CO_2$, the dissolved $CO_2$ may be removed by techniques known to one skilled in the art, such as aeration.

The processes and systems described herein may be reduce required energy input. Approximately 450-500 BTU of energy are required to heat one gallon of water from room temperature to its boiling point under atmospheric pressure. In contrast, approximately 7,200 BTU of energy are required to transition one gallon of water from the liquid phase to the vapor phase. As such, vaporization of the contaminated water requires a significant energy input. Additional energy is required to heat the steam exiting the still and the oxidant to a temperature sufficient to oxidize the vapor phase organic compounds. For example, heating the steam exiting the still to for example 400° C. (as would be required for an oxidation catalyst) would require an additional 2,000 to 3,500 BTU per gallon water, depending on the amount of oxidant being added. As such, recovery of as much energy as possible may reduce the operating costs of the processes and systems described herein.

In both systems, the distillation still 20, 50 removes suspended solids and dissolved material; however, the distillation still 20, 50 will also remove bacteria and viruses, plus a portion of the organic matter that has a boiling point significantly greater than that of water. The oxidation unit is intended to decompose any organic matter that exits the distillation still with the water vapor, converting the organic matter to $CO_2$ and $H_2O$ via reactions known to one skilled in the art. Examples of configurations designed to minimize the energy input to the process are presented in the following paragraphs. These examples are not intended to be exclusive but rather to indicate various configurations.

As described above in relation to FIG. 1, the contaminated water 22 can be added batchwise or continuously. Within the distillation still 20, the contaminated water 22 is heated to a temperature sufficient to generate water vapor, with the water vapor/steam and volatilized organic compounds exiting the top of the still in a process stream 24*a*. At this point, the water vapor is heated, combined with an oxidation source, and delivered to an oxidation unit 30. The oxidation unit 30 converts the organic compounds associated with the process stream 24*b* to $CO_2$ and $H_2O$.

In some embodiments, the purified water vapor 34 exiting the oxidation unit may be delivered directly to heat exchanger coils located within the distillation still 20 (not explicitly shown in FIG. 1). In this manner, the energy associated with high temperature process stream 34 exiting the oxidation unit 30 may be recovered. The water vapor associated with the product stream exiting the heat exchanger coils located within the distillation still 30 may be condensed and recovered, or alternatively, vented to atmosphere. Suspended solids and dissolved material 22 will settle to the bottom of the distillation still 20 and can be removed by techniques known to one skilled in the art, such as an auger screw, or merely washed from the distillation still. Residual non-volatilized organic matter (high molecular weight oils) 22 may be removed at the time the still 20 is cleaned or shut down. For example, said oils may be skimmed from the surface of water present in the distillation still 20.

In some embodiments, such as that shown in FIG. 2, the water vapor 54 exiting the still 50 may be heated to an intermediate temperature by passing through a heat exchanger 60, combined with air and/or another oxidation source 64, then heated to the target operating temperature and delivered to an oxidation unit 70. The oxidation unit 70 converts the organic compounds associated with the process stream 62 to $CO_2$ and $H_2O$ by reactions known to one skilled in the art. The oxidation unit can be a thermal oxidizer and/or a catalytic reactor. The purified water vapor 74 exiting the oxidation unit 70 is delivered back to the heat exchanger 60 used to pre-heat the process stream 54. In this manner, the energy associated with the effluent stream 74 from the oxidation unit 70 is used to pre-heat the feed stream 54 to the oxidation unit 70. The process stream 66 exiting the heat exchanger 60 may be vented to atmosphere. Alternatively, the process stream 66 exiting the heat exchanger 60 may be delivered to heat exchanger coils 84 located within the distillation still 50. The purified water vapor 86 exiting the heat exchanger coils 84 may be condensed and recovered, or vented to atmosphere. Suspended solids and dissolved material 52 will settle to the bottom of the distillation still 50 and can be removed by techniques known to one skilled in the art, such as an auger screw, or merely washed from the distillation still 50. Residual non-volatilized organic matter (high molecular weight oils) 52 may be removed at the time the still 50 is cleaned or shut down. At which point, said oils can be skimmed from the surface of any water 42 present in the distillation still 50.

In some embodiments, the energy associated with the effluent stream 74 from the oxidation unit 70 is used to pre-heat the feed stream 54/62 to the oxidation unit 70. The process stream 66 exiting the heat exchanger 66 is delivered to a steam compressor 80. The stream compressor 80 compresses the process stream 66 to an elevated pressure, such as greater than about 3 psig, and, in some embodiments, greater than about 15 psig. Compressing the process stream increases the dew point temperature of the water vapor, thereby allowing for recovery of the heat of condensation. In the example shown in FIG. 2, the steam compressor 80 is located downstream of the oxidation unit 70. In some embodiments, the steam compressor 80 may be located upstream of the oxidation unit 70. The pressurized process stream 82 may then be delivered to a heat exchanger 84 located within the distillation still 50. In this manner, a significant amount (e.g., greater than 50%) of the heat of condensation associated with the water vapor may be recovered.

Configurations presented above represent examples and as such do not limit the scope of the present disclosure. The processes and systems may be operated batchwise or continuously. Batchwise operation involves filling the distillation still with contaminated water, closing the still, and heating the still to a temperature as necessary to generate water vapor at a targeted rate. Once the volatile contents of the still (for example, water and organic contaminants) have been removed to the target level, such as greater than 90%, the still is cooled, emptied of brine, solids, and/or non-volatilized organic matter and the process is repeated.

In a continuous mode of operation, the distillation still is operated at a target contaminated water level range. Contaminated water is continuously added to the distillation still, with the volatile components (primarily water with lower levels of volatile organic contaminants) boiled away at a rate consistent with that of contaminated water additions. Solid material that settles to the bottom of the still may be removed continuously, such as by an auger screw. Alternatively, the distillation still may be periodically shut down for the removal of brine and solids, plus residual non-volatilized organic matter.

In some embodiments, upstream unit operations may remove all or a portion of the suspended solids prior to the contaminated water entering the distillation still. Said operations are known by one skilled in the art and include settling tanks, aeration vessels and filter presses, for example.

The distillation still removes the suspended solids and dissolved material from the contaminated water. The distillation still will also remove any non-volatilized organic matter, such as high molecular weight hydrocarbons with boiling points significantly greater than that of water. As such, the design of the distillation still can vary in configuration depending on several factors that include the heat recovery, heat input, and brine/solid removal, for example. The design and operation of a distillation still is known to one skilled in the art. The distillation still can be heated directly or indirectly using oil, natural gas, gasoline, and/or kerosene, for example. Alternatively, the distillation still can be electrically heated. In some embodiments, the distillation still includes heat exchanger coils to recover heat associated with the effluent stream of the oxidation unit. The distillation may allow continuous removal of brine and solids that settle at the bottom of the still. For example, an auger can be employed to transport the solids from the bottom of the distillation still. The distillation still can be operated at or near atmospheric pressure, under vacuum or under pressure. A multi-stage distillation still can also be employed. The solids that accumulate at the bottom of the distillation still can be removed on a continuous or periodic basis.

The oxidation unit removes organic compounds from the water vapor that exits the distillation still. A chemical reaction between the vapor phase organic compounds and an oxidant (such as oxygen) converts the organic compounds to $CO_2$ and $H_2O$. Examples of oxidation units that are capable of decomposing organic compounds in the vapor phase include a thermal oxidizer and a catalytic reactor. The design and operation of a thermal oxidizer are known to one skilled in the art. Thermal oxidizers heat the process stream to temperatures of approximately greater than about 800° C. as required to oxidize organic compounds present in the water vapor exiting the distillation still. Thermal oxidizers may be of a reverse flow design. The size of the thermal oxidizer is dependent on the flow rate of the process stream, the operating temperature, and the nature of the organic compounds present in the process stream.

A catalytic reactor uses a catalyst to promote oxidation reactions necessary to convert organic compounds present in the water vapor exiting the distillation still to $CO_2$ and $H_2O$. The size of the catalytic reactor may depend on and/or limit the flow rate of the process stream, the operating temperature of the reactor, the nature of the organic compounds present in the process stream, and the composition of the catalyst. The catalyst may be comprised of noble metal or base metal, or mixtures thereof, dispersed upon a high surface area substrate, such as aluminum oxide. Example noble metals include platinum and palladium. Base metals may include copper, iron, and nickel. The design and use of oxidation catalysts to decompose organic compounds in the vapor phase is known to one skilled in the art. The catalytic reactor will operate at a temperature necessary to achieve the desired destruction efficiency of the organic compounds that exit the distillation still with water vapor. The operating temperature of the catalyst may be as low as below about 200° C. or as high as greater than 600° C. In some embodiments, the oxidation unit achieves greater than 75% destruction of organic compounds present in the water vapor, greater than 90% destruction, and/or more preferably greater than 99% destruction.

A steam compressor may increase heat recovery from the process flow. In some embodiments, the steam compressor raises the pressure of the steam exiting the catalytic reactor to a point sufficient to raise the dew point temperature of the steam to greater than about 5° C. above the boiling point of the contaminated water in the distillation still, and/or greater than about 20° C. above the boiling point of the contaminated water in the distillation still. In this manner, a significant amount of the heat of condensation can be recovered in the distillation still. In some embodiments, the steam compressor can be located upstream of the oxidation unit. Such an arrangement increases the residence time of the process stream in the oxidation unit, thereby reducing the size of the oxidation unit.

An oxidant, such as air, ozone, and/or a mixture thereof, may be added upstream of the oxidation unit in order to facilitate oxidation reactions to decompose the organic matter present in the vapor phase. In some embodiments, the oxidant source is added to the distillation still. In some embodiments, the oxidant source is added to the stream exiting the distillation still at any point upstream of the oxidation unit. The oxidant source may be pre-heated prior to introduction into the process. The amount of oxidant added to the process upstream of the oxidation unit should be sufficient to completely oxidize the organic contaminants to $CO_2$ and H2O.

Water vapor exiting the processes and systems may be vented to atmosphere. Alternatively, the water vapor exiting the novel process may be condensed for re-use or release into ponds, streams, rivers, lakes, ground water, etc. $CO_2$ may be generated as a result of the oxidation reactions. Should the levels of $CO_2$ in the condensed water be unacceptable, an additional process may be necessary in order to remove the dissolved $CO_2$. For example, the condensed, purified water may be aerated.

It is possible that organic compounds containing fluorine, chlorine, bromine, sulfur, and/or mixtures thereof, may be present with the water vapor exiting the distillation still. Said compounds, examples of which include halogenated organic compounds, mercaptans and hydrogen sulfide, may react within the oxidation unit to yield products that may include mineral acids, examples of which include HCl, HF, HBr, and/or $H_2SO_4$. Should this be the case, an acid gas abatement unit, such as a solid adsorber designed to remove acid gases, may be used. Otherwise, the product water may not be of a suitable pH for release to the atmosphere or reuse/release.

EXAMPLES

A pilot scale process was constructed to assess the effectiveness of the proposed process to purify water contaminated with salts, suspended solids, and organic compounds. The pilot scale process included a distillation still and a catalytic reactor. The process was operated by adding the contaminated water to the distillation still, heating the contaminated water to its boiling point, adding air to the water vapor, and diverting the resulting process stream to a catalytic reactor. The catalytic reactor was operated at between 350° C. and 400° C. and employed a supported noble metal catalyst in the form of a monolith. The pilot scale process generated approximately 250 ml purified water per hour. Air was added to the process stream exiting the distillation still at a flow rate of 1 Nl/min (Nl is defined as normal liter and refers to 1 liter of gas at 1 atmosphere pressure, 0° C.). The process gas exiting the catalytic reactor was delivered to a condenser in order to recover the water for evaluation purpose. A portion of the effluent stream was delivered to a gas chromatograph for analysis of $CO_2$, which was used to verify the oxidation reactions. Product purified water was analyzed for residual solids and organic compounds.

EXAMPLE 1

Comparative

A produced water sample was obtained from the Utica shale oil fields. The water was mixed and a sample was analyzed for total organic content and solids content (suspended solids and dissolved material). The total organic content of the mixture was determined to be on the order of 450 mg/l. The solids content was on the order of 15%. Solids were comprised of sodium, calcium, iron, zinc, iron, phosphorous and chlorine.

1.0 liters of the produced water was loaded into a pilot scale distillation still. The water in the distillation still was heated to boil, which required approximately 30 minutes to achieve. Once at boil, water in the distillation still was evaporated at a rate of approximately 320 ml/min. Water vapor from the distillation still was delivered to a condenser, where product liquid water was recovered. Upon completion of the distillation operation, an oily sheen was observed on the surface of the product water. The total dissolved solids (TDS) content of the product water was 82.5 ppm. The organic content of the product water was 192 mg/liter.

EXAMPLE 2

1.0 liters of the produced water sample of Example 1 was loaded into the pilot scale distillation still. 1.0 Nl of air were pre-heated to approximately 100° C. and delivered to the top of the distillation still as an oxidant source for the catalyst. The process stream exiting the distillation still was delivered to a catalytic reactor, then to a condenser. The catalytic reactor was housed in a tube furnace and heated to approximately 400° C. Approximately 39 $cm^3$ of a supported noble metal oxidation catalyst, in the form of a monolith, was located within the catalytic reactor for the purpose of oxidizing the organic compounds to $CO_2$ and water vapor. Under operating conditions, the residence time of the process stream through the catalyst is approximately 0.27 seconds. A portion of the effluent stream was delivered to a gas chromatograph for $CO_2$ analysis.

The water in the distillation still was heated to boil, which required approximately 30 minutes to achieve. Once at boil, water in the distillation still was evaporated at a rate of approximately 320 ml/min. $CO_2$ was detected in the effluent stream throughout the duration of the run. Upon completion of the distillation operation, no oily sheen was observed on the surface of the product water. Examination of the distillation still revealed a significant amount of solid material. The product water was analyzed using solvent extraction techniques for the concentration of hydrocarbons. Results of the analysis indicated that to within the detection limits of the methodology, no organic compounds were associated with the product water. The total dissolved solid (TDS) content of the product water was measured to be 43.2 ppm. Results demonstrate that the described process produces high purity water.

The pH of the product water was measured to be 9.05. Air was bubbled through the product water for 1 hour in order to remove dissolved $CO_2$. Upon completion of the aeration process, the pH of the water was measured to be 7.11. This result demonstrates that dissolved $CO_2$ can readily be removed from the product water by aeration.

EXAMPLE 3

2.0 liters of the produced water sample of Example 1 was loaded into the pilot scale distillation still. 1.0 Nl of air were pre-heated to approximately 100° C. and delivered to the top of the distillation still as an oxidant source for the catalyst. The process stream exiting the distillation still was delivered to a catalytic reactor, then to a condenser. The catalytic reactor was housed in a tube furnace and heated to approximately 400° C. Approximately 39 $cm^3$ of a supported noble metal oxidation catalyst, in the form of a monolith, was located within the catalytic reactor for the purpose of oxidizing the organic compounds to $CO_2$ and water vapor. Under operating conditions, the residence time of the process stream through the catalyst is approximately 0.27 seconds. A portion of the effluent stream was delivered to a gas chromatograph for $CO_2$ analysis.

The water in the distillation still was heated to boil, which required approximately 30 minutes to achieve. Once at boil, water in the distillation still was evaporated at a rate of approximately 320 ml/min. Upon completion of the operation, the distillation still was emptied to remove the residual solids, and the operation was repeated a total of 20 times in order to assess the durability of the catalyst. Selected water samples, including the first and last, were analyzed for total dissolved solids (TDS), organic content and pH following aeration. For all water samples, the TDS never exceed 50 ppm and to within the detection limits of the instruments, no organic compounds were detected. For all samples, the pH of the product water following aeration never exceeded 7.7.

What is claimed is:

1. A system for removing contaminants from contaminated water, the system comprising:
    a distillation still supplying heat to contaminated water to boil the contaminated water;
    a vent allowing a vapor stream to exit the distillation still;
    an oxidation unit removing additional contaminants from the vapor stream;
    an outlet discharging a purified water stream from the oxidation unit; and
    a heat exchanger transferring heat from the purified water stream leaving the oxidation unit to the vapor stream exiting the distillation still before the vapor stream enters the oxidation unit.

2. A system according to claim 1, wherein the oxidation unit comprises a thermal oxidizer.

3. A system according to claim 1, wherein the oxidation unit comprises a catalytic reactor.

4. A system according to claim 1, further comprising an inlet adding air to the vapor stream before entering the oxidation unit.

5. A system according to claim 1, wherein the oxidation unit comprises a catalytic reactor operated at a temperature between 200° C. and 600° C. with a noble metal catalyst.

6. A system according to claim 1, further comprising a steam compressor downstream of the heat exchanger supplying superheated steam to the distillation still for boiling the contaminated water.

7. A system according to claim 1, wherein the contaminated water comprises process water from a hydraulic fracturing operation.

* * * * *